US012119152B2

(12) United States Patent
Ito et al.

(10) Patent No.: US 12,119,152 B2
(45) Date of Patent: Oct. 15, 2024

(54) LAMINATED COIL

(71) Applicant: Murata Manufacturing Co., Ltd., Nagaokakyo (JP)

(72) Inventors: Shingo Ito, Nagaokakyo (JP); Takumi Tanaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1059 days.

(21) Appl. No.: 15/990,857

(22) Filed: May 29, 2018

(65) Prior Publication Data

US 2018/0277293 A1 Sep. 27, 2018

Related U.S. Application Data

(63) Continuation of application No. PCT/JP2016/083310, filed on Nov. 10, 2016.

(30) Foreign Application Priority Data

Dec. 14, 2015 (JP) ................................ 2015-243117
Jan. 22, 2016 (JP) ................................ 2016-010575

(51) Int. Cl.
*H01F 17/00* (2006.01)
*H01F 17/04* (2006.01)
*H01F 27/28* (2006.01)

(52) U.S. Cl.
CPC ......... *H01F 17/0013* (2013.01); *H01F 17/04* (2013.01); *H01F 27/2804* (2013.01);
(Continued)

(58) Field of Classification Search
CPC .... H01F 5/003; H01F 17/0013; H01F 17/006; H01F 27/2804; H01F 2017/002;
(Continued)

(56) References Cited

U.S. PATENT DOCUMENTS 5,952,909 A 9/1999 Umeno et al.
8,274,352 B2 * 9/2012 Wei .................... H01F 17/0013
336/178
(Continued)

FOREIGN PATENT DOCUMENTS

JP 08-069935 A 3/1996
JP 2001085230 A * 3/2001 ......... H01F 27/2804
(Continued)

OTHER PUBLICATIONS

Official Communication issued in International Patent Application No. PCT/JP2016/083310, mailed on Jan. 24, 2017.

*Primary Examiner* — Tszfung J Chan
(74) *Attorney, Agent, or Firm* — Keating & Bennett, LLP

(57) ABSTRACT

A laminate of a laminated coil includes first and second sections in a stacking direction from a first surface toward a second surface. The number of windings of each of coil conductor patterns on insulation resin layers, respectively, in the first region is equal to or more than the number of windings of a coil conductor pattern on an insulation resin layer in the second section, and is more than the number of windings of the coil conductor pattern closest to the second surface in the second section. The number of main conductor portions per unit distance in the first section is more than the number of main conductor portions per unit distance in the second section. The outermost main conductor portion of the coil conductor pattern in the second section has a width more than a width of the main conductor portion of the coil conductor pattern in the first section.

12 Claims, 6 Drawing Sheets

(52) U.S. Cl.
CPC .................. *H01F 2017/002* (2013.01); *H01F 2017/0073* (2013.01); *H01F 2017/048* (2013.01); *H01F 2027/2809* (2013.01)

(58) Field of Classification Search
CPC ............. H01F 2027/2809; H01F 17/04; H01F 2017/0066; H01F 27/245; H01F 2017/048
USPC .................................................. 336/200, 232
See application file for complete search history.

(56) References Cited

U.S. PATENT DOCUMENTS

| | | | | |
|---|---|---|---|---|
| 2002/0030576 | A1* | 3/2002 | Kusano | H01F 17/0006 336/223 |
| 2002/0038680 | A1* | 4/2002 | Arai | B22D 11/0651 148/301 |
| 2002/0070836 | A1* | 6/2002 | Fujiyoshi | H01F 30/10 336/200 |
| 2002/0157849 | A1 | 10/2002 | Sakata | |
| 2010/0141369 | A1* | 6/2010 | Mori | H01F 38/14 336/200 |
| 2012/0075038 | A1 | 3/2012 | Kaizaki | |
| 2012/0306609 | A1* | 12/2012 | Kato | H01F 17/0013 336/200 |
| 2012/0326827 | A1 | 12/2012 | Nanjyo et al. | |
| 2013/0200977 | A1* | 8/2013 | Miyazaki | H01F 17/0013 336/192 |
| 2013/0300529 | A1* | 11/2013 | Chang | H01F 27/292 336/200 |
| 2015/0279548 | A1* | 10/2015 | Ngo | H01F 41/041 336/200 |
| 2015/0340149 | A1* | 11/2015 | Lee | H01F 27/292 336/200 |
| 2016/0027578 | A1 | 1/2016 | Nishino et al. | |
| 2017/0264131 | A1* | 9/2017 | An | H02J 50/10 |
| 2017/0365387 | A1* | 12/2017 | Kusawake | H02M 7/537 |

FOREIGN PATENT DOCUMENTS

| | | | | | |
|---|---|---|---|---|---|
| JP | 2002246231 | A | * | 8/2002 | H01F 17/0013 |
| JP | 2004135455 | A | * | 4/2004 | G06K 19/07796 |
| JP | 2004171715 | A | * | 6/2004 | |
| JP | 2012070243 | A | * | 4/2012 | |
| JP | 2012182379 | A | * | 9/2012 | |
| JP | 2013-168553 | A | | 8/2013 | |
| JP | 2014-017035 | A | | 1/2014 | |
| WO | 2010/137083 | A1 | | 12/2010 | |
| WO | 2012/008171 | A1 | | 1/2012 | |
| WO | 2015/079941 | A1 | | 6/2015 | |

* cited by examiner

LAMINATED COIL

CROSS REFERENCE TO RELATED APPLICATIONS

This application claims the benefit of priority to Japanese Patent Application No. 2015-243117 filed on Dec. 14, 2015 and Japanese Patent Application No. 2016-010575 filed on Jan. 22, 2016 and is a Continuation Application of PCT Application No. PCT/JP2016/083310 filed on Nov. 10, 2016. The entire contents of these applications are hereby incorporated herein by reference.

BACKGROUND OF THE INVENTION

1. Field of the Invention

The present invention relates to a laminated coil including stacked insulation resin layers each provided with a conductor.

2. Description of the Related Art

WO 2015/079941 A describes a coil formed by winding a linear conductor pattern on a plurality of insulation resin layers and stacking the plurality of insulation resin layers. The linear conductor pattern formed on each of the insulation resin layers is connected by an interlayer connection end portion passing through the corresponding one of the insulation resin layers in its thickness direction.

In the coil described in WO 2015/079941 A, the conductor pattern formed on each insulation resin layer includes a portion with a large width and a portion with a small width. The portion with a large width and the portion with a small width are connected in the layer, and this structure forms a linear conductor pattern.

Unfortunately, it is difficult to increase the number of windings in the layer in the structure described in WO 2015/079941 A as compared to the case of forming a conductor pattern in a layer only with a small width portion. For this reason, it is not easy to increase magnetic flux density on a specific surface side of a base material forming the coil without increasing a planar size of the laminate, for example. In addition, a conductor pattern with a small width has a larger conductor loss than a conductor pattern with a large width.

SUMMARY OF THE INVENTION

Preferred embodiments of the present invention provide laminated coils each capable of increasing magnetic flux density generated on a specific surface side of a laminate without increasing a planar size of the laminate and reducing an increase in conductor loss.

A laminated coil according to a preferred embodiment of the present invention includes a laminate including a plurality of insulation resin layers that are stacked and each provided with a coil conductor pattern including a wound linear main conductor portion and connection end portions connected to both ends of the main conductor portion. The laminate includes a first region and a second region in a stacking direction of the plurality of insulation resin layers from a first surface to a second surface. The number of windings of the coil conductor pattern provided on the insulation resin layer in the first region is equal to or greater than the number of windings of the coil conductor pattern provided on the insulation resin layer in the second region, and is greater than the number of windings of the coil conductor pattern closest to the second surface in the second region. The number of the main conductor portions per unit distance in a width direction of the coil conductor pattern in the first region is greater than the number of the main conductor portions per unit distance in a width direction of the coil conductor pattern in the second region. The outermost main conductor portion of the coil conductor pattern in the second region has a width greater than a width of the main conductor portion of the coil conductor pattern in the first region.

In the above structure, the number of windings of the coil conductor pattern in the first region on a first surface side is greater than the number of windings of the coil conductor pattern in the second region on a second surface side, and a density of winding in the first region on the first surface side is greater than a density of winding in the second region on the second surface side. This prevents the laminated coil from increasing in planar size while magnetic flux density on the first surface side is higher than magnetic flux density on the second surface side. In addition, an increase in the width of the coil conductor pattern in the second region on the second surface side enables a conductor loss as a coil to be reduced as compared to a configuration in which the coil conductor pattern in the second region has the same or substantially the same width as the coil conductor pattern in the first region.

In a laminated coil according to a preferred embodiment of the present invention, it is preferable that the laminate includes a region with an outline of the outermost conductor pattern of the main conductor portion of the coil conductor pattern in the first region, and a region with an outline of the outermost conductor pattern of the main conductor portion of the coil conductor pattern in the second region, the regions coinciding with each other in all or substantially all areas in plan view.

This structure enables the laminated coil to be reduced in size in plan view as much as possible while achieving the electrical characteristics described above.

In a laminated coil according to a preferred embodiment of the present invention, it is preferable that the insulation resin layer is made of a thermoplastic resin.

This structure causes the laminate to be easily formed by heating pressing.

In a laminated coil according to a preferred embodiment of the present invention, it is preferable that the laminate includes two or more conductor patterns extending parallel or substantially parallel to each other that define the main conductor portion of the coil conductor pattern in the first region, at least a portion in the extending direction of the two or more conductor patterns overlapping with the outermost main conductor portion of the coil conductor pattern of the second region disposed parallel or substantially parallel to the coil conductor pattern in the first region in the stacking direction in plan view.

This structure reduces or prevents an undesired resin flow when the laminate is heated and pressed while achieving the electrical characteristics described above.

In a laminated coil according to a preferred embodiment of the present invention, it is preferable that the laminate includes a wound main conductor portion in the coil conductor pattern provided on the insulation resin layer in the first region, and a wound main conductor portion in the coil conductor pattern provided on the insulation resin layer in the second region, the wound main conductor portions overlapping with each other throughout an entire or substantially an entire circumference in plan view.

This structure reduces or prevents a resin flow when the plurality of insulation resin layers is heated and pressed.

It is preferable that a laminated coil according to a preferred embodiment of the present invention includes a through hole passing through the laminate from a top surface to a bottom surface in an opened portion of the coil conductor pattern in plan view.

This structure enables the through hole to be used as an alignment mark of the laminated coil to dispose the laminated coil at a desired position with high accuracy.

It is preferable that a laminated coil according to a preferred embodiment of the present invention includes a translucent member that is disposed on or in at least one of the top surface and the bottom surface of the laminate so as to cover the through hole.

This structure prevents the through hole from being exposed, and enables a reduction in deformation of the laminate.

According to preferred embodiments of the present invention, it is possible to increase the magnetic flux density generated on the specific surface side of the laminate while an increase in conductor loss is reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
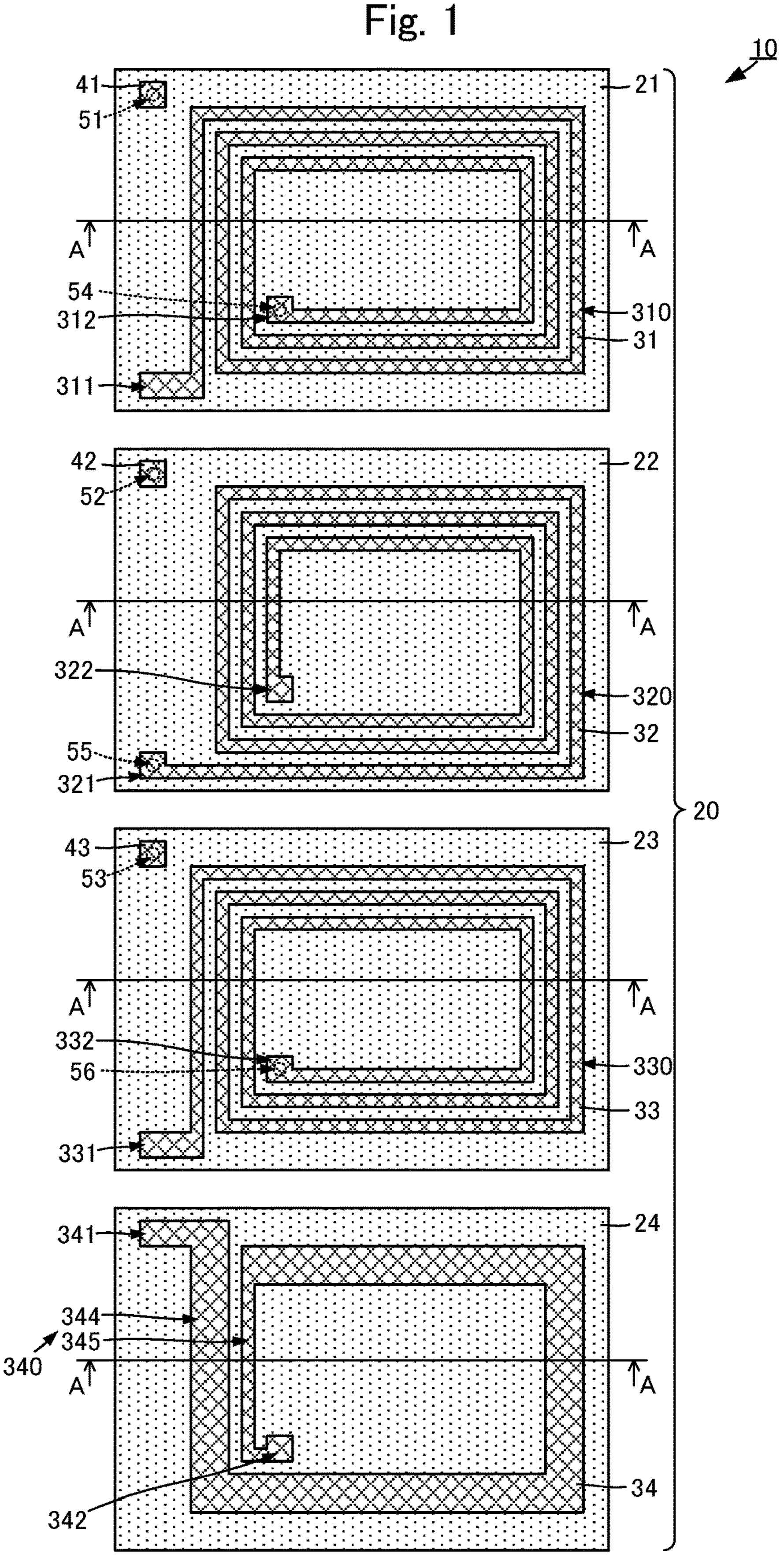
FIG. 1 is an exploded plan view of a laminated coil according to a first preferred embodiment of the present invention.
Figure 2:
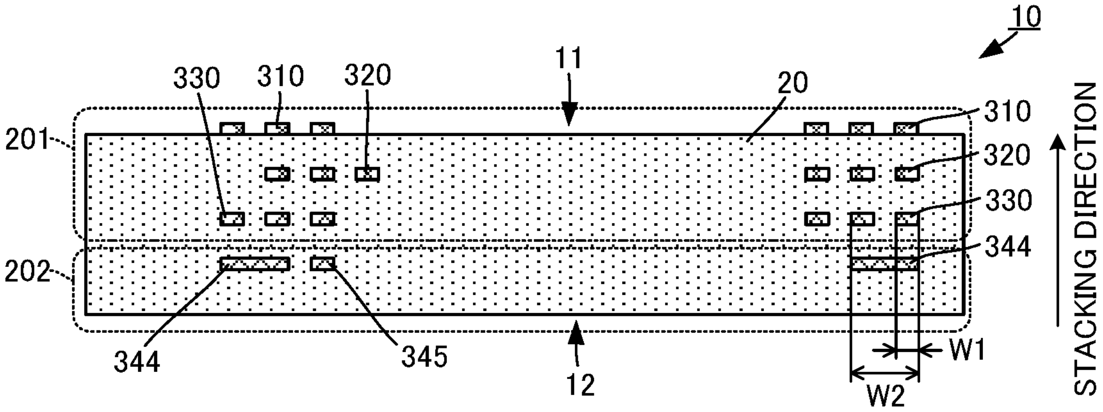
FIG. 2 is a side sectional view of the laminated coil according to the first preferred embodiment of the present invention.

Laminated coils according to preferred embodiments of the present invention will be described with reference to the drawings. FIG. 1 is an exploded plan view of a laminated coil according to a first preferred embodiment of the present invention. FIG. 2 is a side sectional view of the laminated coil according to the first preferred embodiment of the present invention.

As illustrated in FIGS. 1 and 2, a laminated coil 10 includes a laminate 20. The laminate 20 includes insulation resin layers 21, 22, 23, and 24, coil conductor patterns 31, 32, 33, and 34, and wiring conductor patterns 41, 42, and 43.

The insulation resin layers 21, 22, 23, and 24 are stacked in this order. The insulation resin layer 21 defines a first surface 11 of the laminate 20. The insulation resin layer 24 defines a second surface 12 of the laminate 20.

The insulation resin layer 21 includes on its surface (a surface to be the first surface 11 of the laminate 20), opposite to the insulation resin layer 22, the coil conductor pattern 31 and the wiring conductor pattern 41. The coil conductor pattern 31 includes a main conductor portion 310, and connection end portions 311 and 312. The main conductor portion 310 is preferably defined by a triple-wound linear conductor with a constant or substantially constant width, for example. The main conductor portion 310 preferably has a width W1 that is constant or substantially constant throughout its length. The connection end portion 311 is connected to an outer peripheral end of the main conductor portion 310. The connection end portion 312 is connected to an inner peripheral end of the main conductor portion 310. The wiring conductor pattern 41 is spaced away from the coil conductor pattern 31. The connection end portion 311 and the wiring conductor pattern 41 each may also be used as an external terminal.

The insulation resin layer 22 includes on its surface, on an insulation resin layer 21 side, the coil conductor pattern 32 and the wiring conductor pattern 42. The coil conductor pattern 32 includes a main conductor portion 320, and connection end portions 321 and 322. The main conductor portion 320 is preferably defined by a triple-wound linear conductor with a constant or substantially constant width, for example. The main conductor portion 320 preferably has a width W1 that is constant or substantially constant throughout its length. The connection end portion 321 is connected to an outer peripheral end of the main conductor portion 320. The connection end portion 322 is connected to an inner peripheral end of the main conductor portion 320. The wiring conductor pattern 42 is spaced away from the coil conductor pattern 32.

The connection end portion 322 of the coil conductor pattern 32 is connected to the connection end portion 312 of the coil conductor pattern 31 by an interlayer connection end portion 54 passing through the insulation resin layer 21 in its thickness direction. The wiring conductor pattern 42 is connected to the wiring conductor pattern 41 by an interlayer connection end portion 51 passing through the insulation resin layer 21 in its thickness direction.

The insulation resin layer 23 includes on its surface, on an insulation resin layer 22 side, the coil conductor pattern 33 and the wiring conductor pattern 43. The coil conductor pattern 33 includes a main conductor portion 330, and connection end portions 331 and 332. The main conductor portion 330 is preferably defined by a triple-wound linear conductor with a constant or substantially constant width, for example. The main conductor portion 330 preferably has a width W1 that is constant or substantially constant throughout its length. The connection end portion 331 is connected to an outer peripheral end of the main conductor portion 330. The connection end portion 332 is connected to an inner peripheral end of the main conductor portion 330. The wiring conductor pattern 43 is spaced away from the coil conductor pattern 33.

The connection end portion 332 of the coil conductor pattern 33 is connected to the connection end portion 321 of the coil conductor pattern 32 by an interlayer connection end portion 55 passing through the insulation resin layer 22 in its thickness direction. The wiring conductor pattern 43 is connected to the wiring conductor pattern 42 by an interlayer connection end portion 52 passing through the insulation resin layer 22 in its thickness direction.

The insulation resin layer 24 includes on its surface (a surface opposite to a surface to be the second surface 12 of the laminate 20), on an insulation resin layer 23 side, the coil conductor pattern 34. The coil conductor pattern 34 includes a main conductor portion 340, and connection end portions 341 and 342. The main conductor portion 340 is a linear conductor. The main conductor portion 340 includes an outermost peripheral portion 344 with a width W2, and an inner peripheral portion 345 with a width W1, where W2>W1. The connection end portion 341 is connected to an outer peripheral end of the main conductor portion 340. The connection end portion 342 is connected to an inner peripheral end of the main conductor portion 340.

The connection end portion 341 of the coil conductor pattern 34 is connected to the wiring conductor pattern 43 by an interlayer connection end portion 53 passing through the insulation resin layer 23 in its thickness direction. The connection end portion 342 of the coil conductor pattern 34 is connected to the connection end portion 332 of the coil conductor pattern 33 by an interlayer connection end portion 56 passing through the insulation resin layer 23 in its thickness direction.

As illustrated in FIG. 2, the laminated coil 10 has a structure in which a first section 201 on a first surface 11 side and a second section 202 on a second surface 12 side are stacked in the stacking direction. The first section 201 includes the coil conductor patterns 31, 32, and 33 provided on the insulation resin layers 21, 22, and 23, respectively. The second section 202 includes the coil conductor pattern 34 provided on the insulation resin layer 24.

As described above, in the coil conductor patterns 31, 32, and 33, the number of windings of each of the main conductor portions 310, 320, 330 is preferably "three", for example, and the number of windings of a portion of the main conductor portion 340, having a large width (W2) is preferably "one", for example. The structure as described above causes the magnetic flux density on the first surface 11 side to be higher than the magnetic flux density on the second surface 12 side when current is applied to the laminated coil 10.

Preferably, the main conductor portions 310, 320, and 330 each have a width W1, and the main conductor portion 340 has a width W2 in its outermost periphery in the coil conductor pattern 34, W2 being greater than W1. This structure enables a conductor loss as the laminated coil 10 to be reduced as compared to the case in which the width of the main conductor portion 340 is the same or substantially the same as that of each of the main conductor portions 310, 320, and 330.

As illustrated in FIG. 2, when the number of main conductor portions per unit distance in the width direction of the outermost peripheral portion of the main conductor portion 340 is set to "one", the number per unit distance in the width direction of the main conductor portions 310, 320, and 330 is preferably set to "two", for example. As a result, even if the number of windings of each of the main conductor portions 310, 320, and 330 in the first section 201 is increased to more than the number of windings of the main conductor portion 340 in the second section 202, the first section 201 is prevented from becoming wider than the second section 202 so as to enable a planar area of the laminate 20 to be reduced.

As described above, the laminated coil 10 is capable of achieving characteristics to increase the magnetic flux density generated on the specific surface side of the laminate while reducing or preventing an increase in conductor loss, without increasing the size of the laminate.

As illustrated in FIG. 2, at least the outermost conductor pattern in each of the main conductor portions 310, 320, and 330 overlaps with one conductor pattern of the main conductor portion 340. More specifically, two conductor patterns of the outermost conductor pattern and the conductor pattern adjacent thereto in each of the main conductor portions 310 and 330 of the first section 201 overlap with the outermost peripheral portion 344 of the main conductor portion 340 in the second section 202 in the stacking direction of the laminate 20, throughout the entire or substantially the entire circumference of the winding shape. Two conductor patterns of the outermost conductor pattern and the conductor pattern adjacent thereto in the main conductor portion 320 in the first section 201 overlap with the outermost peripheral portion 344 of the main conductor portion 340 in the second section 202 in a portion of the winding shape in the stacking direction of the laminate 20. One outermost conductor pattern of the main conductor portion 320 in the first section 201 overlaps with the outermost peripheral portion 344 of the main conductor portion 340 in another portion other than the portion of the winding shape.

The structure as described above provides a region with an outline of the outermost conductor pattern of each of the main conductor portions 310, 320, and 330 in the first section 201, and a region with an outline of the outermost peripheral portion 344 of the main conductor portion 340 in the second section 202, to coincide or substantially coincide with each other in all or substantially all areas. This enables an increase in the area of the laminate 20 to be further reduced or prevented. It is also possible to prevent a short-circuit between the conductor patterns due to an undesired resin flow when the laminate 20 is formed by heating and pressing the insulation resin layers 21, 22, 23, and 24.

As described above, it is particularly preferable that two or more conductor patterns adjacent to each other disposed parallel or substantially parallel along an extending direction of the conductor pattern defining the main conductor portion 310 of the first section 201, two or more conductor patterns adjacent to each other disposed parallel or substantially parallel along an extending direction of the conductor defining the main conductor portion 320, and two or more conductor patterns adjacent to each other disposed parallel or substantially parallel along an extending direction of the conductor pattern defining the main conductor portion 330, overlap with one outermost peripheral portion 344 (a portion with a large width) of the main conductor portion 340 in the second section 202, disposed parallel or substantially parallel to the conductor patterns along the stacking direction. As a result, when the insulation resin layers 21, 22, 23, and 24 are heated and pressed, a resin flow between the two conductor patterns in the same layer is reduced or prevented by the conductor pattern of the outermost peripheral portion 344 overlapping the conductor patterns. Thus, it is possible to prevent a short-circuit between the conductor patterns due to an undesired resin flow.

When at least one of the main conductor portions 310, 320, and 330 overlaps with the outermost peripheral portion 344 (a portion with a large width) of the main conductor portion 340, it is possible to reduce or prevent a resin flow. When at least a portion of each of the main conductor portions 310, 320, and 330 along its extending direction overlaps with the outermost peripheral portion 344 of the main conductor portion 340, it is possible to reduce or prevent a resin flow.

An increase in width of the main conductor portion 340 causes pressure to be less likely to escape during heating pressing to enable a stable heating pressing to be achieved.

It is preferable that the main conductor portions 310, 320, and 330 in the first section 201 overlap with the main conductor portion 340 of the second section 202 throughout the entire or substantially the entire circumference. This structure enables an undesired resin flow to be more reliably reduced or prevented. As shown in the present preferred embodiment, an increase in width of the conductor pattern in the outermost peripheral portion in at least one layer enables displacement of the conductor pattern due to an undesired resin flow to be reduced or prevented.

Figure 3:
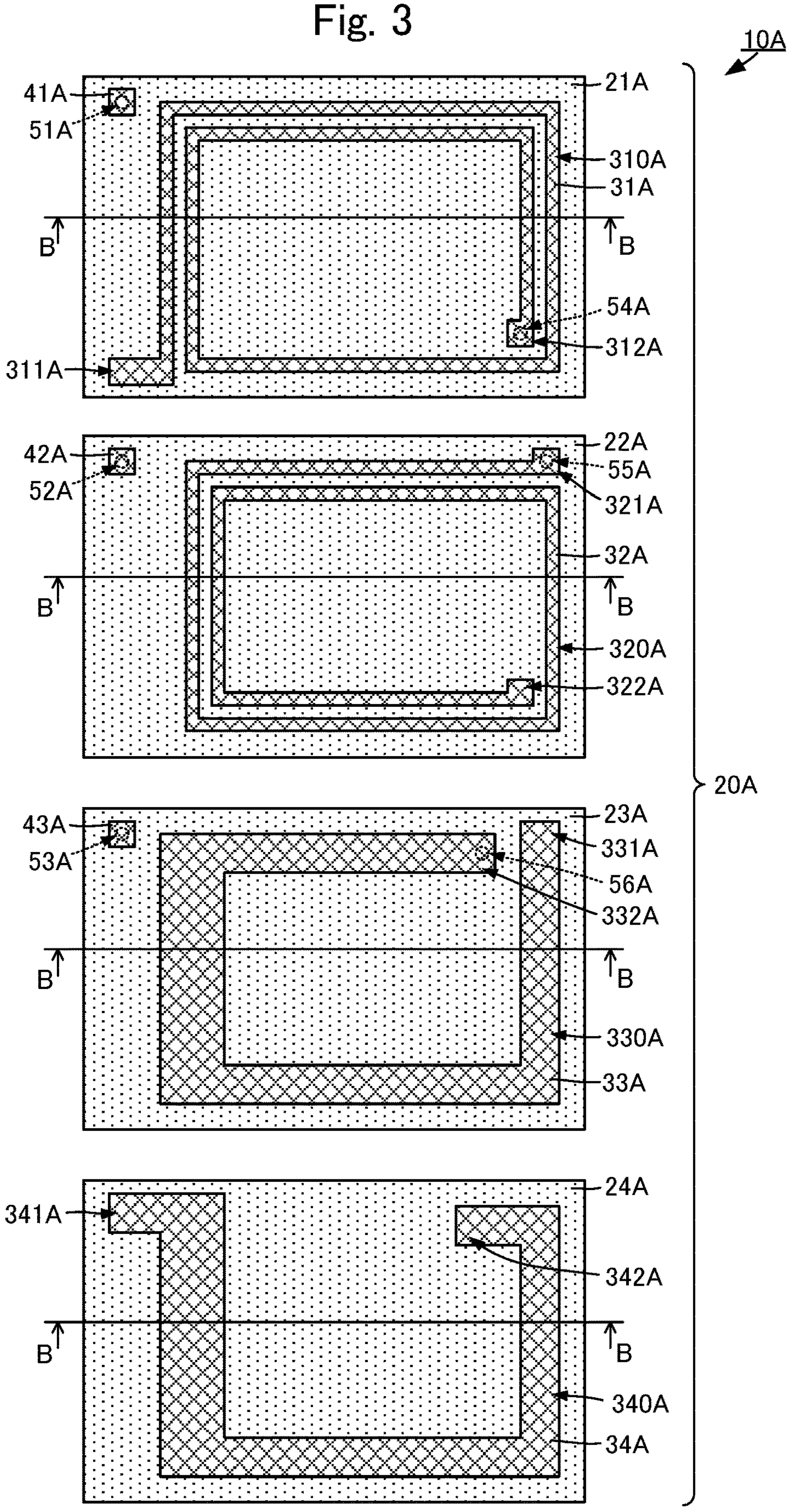
FIG. 3 is an exploded plan view of a laminated coil according to a second preferred embodiment of the present invention.
Figure 4:
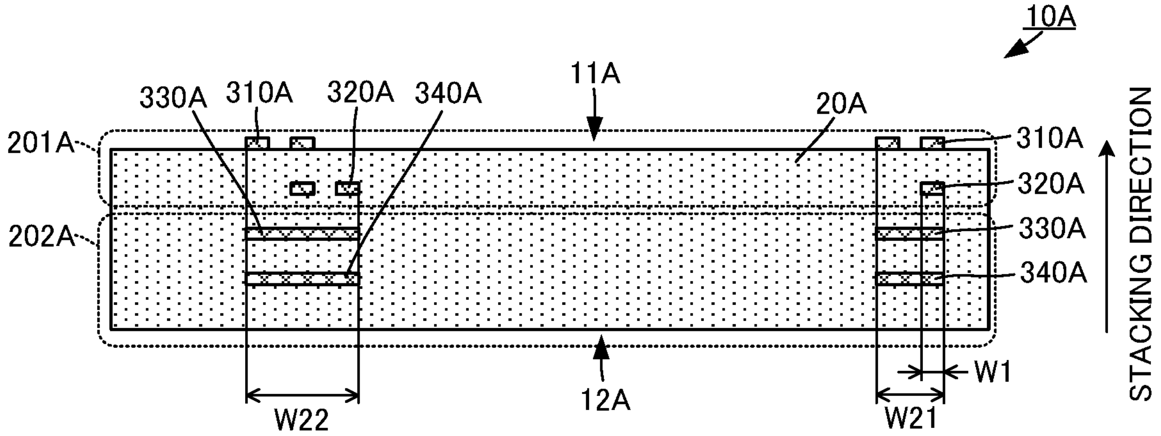
FIG. 4 is a side sectional view of the laminated coil according to the second preferred embodiment of the present invention.

Next, a laminated coil according to a second preferred embodiment of the present invention will be described with reference to the drawings. FIG. 3 is an exploded plan view of the laminated coil according to the second preferred embodiment of the present invention. FIG. 4 is a side sectional view of the laminated coil according to the second preferred embodiment of the present invention.

While a laminated coil 10A according to the present preferred embodiment is the same or substantially the same as the laminated coil 10 according to the first preferred embodiment in basic structure, it is different in that a plurality of insulation resin layers are provided, each including a wide coil conductor pattern.

The laminated coil 10A includes a laminate 20A. The laminate 20A includes insulation resin layers 21A, 22A, 23A, and 24A, coil conductor patterns 31A, 32A, 33A, and 34A, and wiring conductor patterns 41A, 42A, and 43A.

The insulation resin layers 21A, 22A, 23A, and 24A are stacked in this order. The insulation resin layer 21A defines a first surface 11A of the laminate 20A. The insulation resin layer 24A defines a second surface 12A of the laminate 20A.

The insulation resin layer 21A includes on its surface (a surface to be the first surface 11A of the laminate 20A), opposite to the insulation resin layer 22A, the coil conductor pattern 31A and the wiring conductor pattern 41A. The coil conductor pattern 31A includes a main conductor portion 310A, and connection end portions 311A and 312A. The main conductor portion 310A is preferably defined by a double-wound linear conductor with a constant or substantially constant width, for example. The main conductor portion 310A preferably has a width W1A that is constant or substantially constant throughout its length. The connection end portion 311A is connected to an outer peripheral end of the main conductor portion 310A. The connection end portion 312A is connected to an inner peripheral end of the main conductor portion 310A. The wiring conductor pattern 41A is spaced away from the coil conductor pattern 31A. The connection end portion 311A and the wiring conductor pattern 41A each may also be used as an external terminal.

The insulation resin layer 22A includes on its surface, on an insulation resin layer 21A side, the coil conductor pattern 32A and the wiring conductor pattern 42A. The coil conductor pattern 32A includes a main conductor portion 320A, and connection end portions 321A and 322A. The main conductor portion 320A is preferably defined by a double-wound linear conductor with a constant or substantially constant width around about ¾ of its circumference, for example. The main conductor portion 320A preferably has a width W1 that is constant or substantially constant throughout its length. The connection end portion 321A is connected to an outer peripheral end of the main conductor portion 320A. The connection end portion 322A is connected to an inner peripheral end of the main conductor portion 320A. The wiring conductor pattern 42A is spaced away from the coil conductor pattern 32A.

The connection end portion 322A of the coil conductor pattern 32A is connected to the connection end portion 312A of the coil conductor pattern 31A by an interlayer connection end portion 54A passing through the insulation resin layer 21A in its thickness direction. The wiring conductor pattern 42A is connected to the wiring conductor pattern 41 by an interlayer connection end portion 51A passing through the insulation resin layer 21A in its thickness direction.

The insulation resin layer 23A includes on its surface, on an insulation resin layer 22A side, the coil conductor pattern 33A and the wiring conductor pattern 43A. The coil conductor pattern 33A includes a main conductor portion 330A, and connection end portions 331A and 332A. The main conductor portion 330A is preferably defined by a single-wound linear conductor with a constant or substantially constant width, for example. The main conductor portion 330A preferably has widths W21 and W22, where W21>W1 and W22>W1, for example. The connection end portion 331A is connected to an outer peripheral end of the main conductor portion 330A. The connection end portion 332A is connected to an inner peripheral end of the main conductor portion 330A. The wiring conductor pattern 43A is spaced away from the coil conductor pattern 33A.

The connection end portion 331A of the coil conductor pattern 33A is connected to the connection end portion 321A of the coil conductor pattern 32A by an interlayer connection end portion 55A passing through the insulation resin layer 22A in its thickness direction. The wiring conductor pattern 43A is connected to the wiring conductor pattern 42A by an interlayer connection end portion 52A passing through the insulation resin layer 22A in its thickness direction.

The insulation resin layer 24A includes on its surface (a surface opposite to a surface to be the second surface 12A of the laminate 20A), on an insulation resin layer 23A side, the coil conductor pattern 34A. The coil conductor pattern 34A includes a main conductor portion 340A, and connection end portions 341A and 342A. The main conductor portion 340A is a linear conductor. The main conductor portion 340 has preferably has widths W21 and W22, for example. The connection end portion 341A is connected to an outer peripheral end of the main conductor portion 340A. The connection end portion 342A is connected to an inner peripheral end of the main conductor portion 340A.

The connection end portion 341A of the coil conductor pattern 34A is connected to the wiring conductor pattern 43A by an interlayer connection end portion 53A passing through the insulation resin layer 23A in its thickness direction. The connection end portion 342A of the coil conductor pattern 34A is connected to the connection end portion 332A of the coil conductor pattern 33A by an interlayer connection end portion 56A passing through the insulation resin layer 23A in its thickness direction.

As illustrated in FIG. 4, the laminated coil 10A has a structure in which a first section 201A on a first surface 11A side and a second section 202A on a second surface 12A side are stacked in the stacking direction. The first portion 201A includes the coil conductor patterns 31A and 32A provided on the insulation resin layers 21A and 22A, respectively. The second section 202A includes the coil conductor patterns 33A and 34A provided on the insulation resin layers 23A and 24A, respectively.

Even the structure as described above enables the laminated coil 10A to achieve characteristics that increase the magnetic flux density generated on the specific surface side of the laminate while reducing or preventing an increase in conductor loss, without increasing the size of the laminate.

As illustrated in FIGS. 3 and 4, the main conductor portions 310A and 320A in the first section 201A overlap with the main conductor portions 330A and 340A in the second section 202A in the stacking direction of the laminate 20A. This enables an increase in area of the laminate to be further reduced or prevented. It is also possible to reduce or prevent a resin flow when the laminate 20A is formed by heating and pressing the insulation resin layers 21A, 22A, 23A, and 24A.

Figure 5:
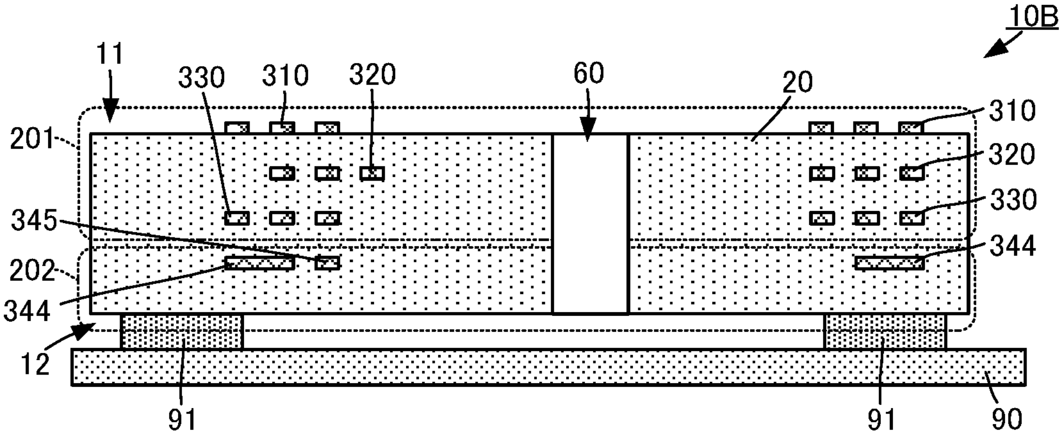
FIG. 5 is a side sectional view of a laminated coil according to a third preferred embodiment of the present invention.

A laminated coil according to a third preferred embodiment of the present invention will be described with reference to the drawings. FIG. 5 is a side sectional view of the laminated coil according to the third preferred embodiment of the present invention.

A laminated coil 10B according to the present preferred embodiment is different from the laminated coil 10 according to the first preferred embodiment in that a through hole 60 is provided. Other structures are the same or substantially the same as those of the laminated coil 10 according to the first preferred embodiment, and descriptions thereof are omitted.

As illustrated in FIG. 5, the laminated coil 10B includes a through hole 60 passing through the laminate 20 from the top surface to the bottom surface of the laminate 20. The through hole 60 is preferably located in a region (a coil opening of the laminated coil 10B) surrounded by the coil conductor patterns 31, 32, 33, and 34 in the laminate 20 in plan view.

When the through hole 60 as described above is provided, the through hole 60 defines an alignment mark of the laminated coil 10B. Specifically, when the laminated coil 10B is mounted on a surface of a base substrate 90 using an adhesive 91 as illustrated in FIG. 5, the through hole 60 is disposed at a desired position in the surface of the base substrate 90 as the alignment mark. When the through hole 60 is provided as described above, the laminated coil 10B is able to be mounted while being accurately disposed at a desired position (e.g., a position where magnetic flux density is desired to be increased) on the base substrate 90.

While a planar shape (cross-sectional shape) of the through hole 60 may be appropriately set, it is preferable that the shape is easily recognized as an alignment mark.

In addition, the through hole 60, or a hole provided on the top surface and the bottom surface of the laminated coil 10B is preferable. This enables an alignment mark to be simply provided with high detectability (recognizability).

Figure 6:
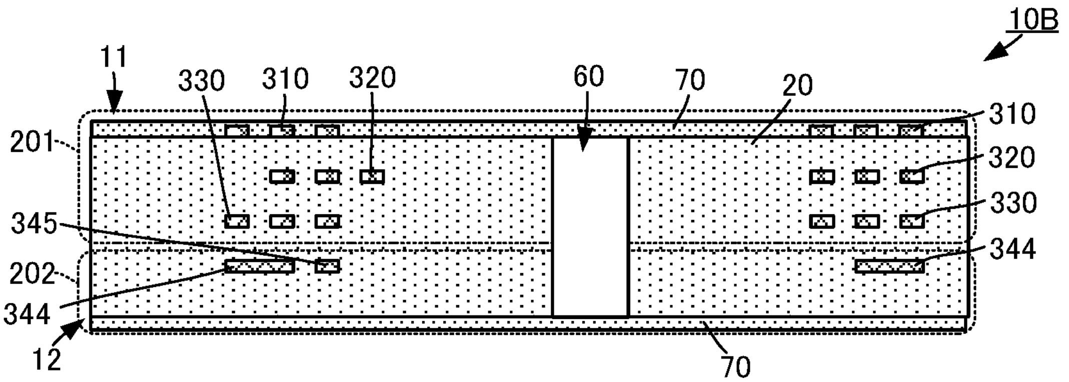
FIG. 6 is a side sectional view of a laminated coil according to a fourth preferred embodiment of the present invention.

A laminated coil according to a fourth preferred embodiment of the present invention will be described with reference to the drawings. FIG. 6 is a side sectional view of the laminated coil according to the fourth preferred embodiment of the present invention.

A laminated coil 10C according to the present preferred embodiment is different from the laminated coil 10B according to the third preferred embodiment in that a protective film 70 is provided. Other structures are the same or substantially the same as those of the laminated coil 10B according to the third preferred embodiment, and descriptions thereof are omitted.

The laminated coil 10C includes the protective film 70. The protective film 70 is attached to the top surface and the bottom surface of the laminate 20. The protective film 70 may cover at least an opening of the through hole 60. The protective film 70 is preferably made of a material having translucency and insulating properties, such as a translucent film and a translucent resist film, for example.

This structure enables the through hole 60 to be prevented from being exposed, and enables a reduction in deformation of the laminate 20. This enables accuracy of placement on the base substrate 90 to be further improved.

While the protective film 70 may be attached to only the top surface or the back surface, it is preferable to attach the protective film 70 to both of the top and back surfaces.

While the above description shows the case in which the number of laminated insulation resin layers is preferably four, for example, the number of laminated layers may be appropriately set according to specifications of the laminated coil and other factors. The number of windings also may be appropriately set according to the specifications. That is, it is preferable that a coil conductor pattern is provided such that the number of winding and placement density of the wound conductor pattern increase and a linear conductor decreases in width in a region in a laminate on a side at which magnetic flux density is desired to be increased as compared with a region on the opposite side.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated coil comprising:

a laminate including:

a plurality of insulation resin layers that are stacked; and a coil conductor pattern provided on each of the plurality of insulation resin layers and including a wound linear main conductor portion and connection end portions connected to both ends of the main conductor portion; wherein the laminate includes a first region and a second region in a stacking direction of the plurality of insulation resin layers from a first surface to a second surface;

a number of windings of the coil conductor pattern provided on the insulation resin layer in the first region is equal to or greater than a number of windings of the coil conductor pattern provided on the insulation resin layer in the second region, and is greater than a number of windings of the coil conductor pattern closest to the second surface in the second region;

a number of the main conductor portions per unit distance in a width direction of the coil conductor pattern in the first region is greater than a number of the main conductor portions per unit distance in a width direction of the coil conductor pattern in the second region;

an outermost main conductor portion of the coil conductor pattern in the second region has a width greater than a width of the main conductor portion of the coil conductor pattern in the first region;

the laminate includes a region with an outline of an outermost conductor pattern of the main conductor portion of the coil conductor pattern in the first region, and a region with an outline of an outermost conductor pattern of the main conductor portion of the coil conductor pattern in the second region, the outermost conductor pattern of the coil conductor pattern in the first region does not protrude from the outermost conductor pattern of the coil conductor pattern in the second region in the width direction perpendicular to the direction in which the conductor pattern extends;

a width of the main conductor portion of an inner peripheral portion in the second region is smaller than a width of an outermost peripheral portion of the main conductor portion in the second region;

a thickness of the main conductor portion of the inner peripheral portion in the second region is the same or substantially the same as a thickness of the outermost peripheral portion of the main conductor portion in the second region;

the plurality of insulation resin layers are made of a thermoplastic resin;

at least one of the coil conductor patterns is sandwiched between the plurality of insulation resin layers such that surfaces of the coil conductor pattern perpendicular to the stacking direction directly contact the thermoplastic resin; and at least two main conductor portions in the first region overlap the outermost peripheral portion of the main conductor portion in the second region in the stacking direction, and another main conductor portion in the first region different from the at least two main conductor portions in the first region overlaps the main conductor portion of the inner peripheral portion in the second region in the stacking direction.

2. The laminated coil according to claim 1, wherein the laminate includes two or more conductor patterns extending parallel or substantially parallel to each other that define the main conductor portion of the coil conductor pattern in the first region, at least a portion in an extending direction of the two or more conductor patterns overlapping with the outermost main conductor portion of the coil conductor pattern of the second region disposed parallel or substantially parallel to the coil conductor pattern in the first region in the stacking direction in plan view.

3. The laminated coil according to claim 1, wherein the laminate includes a wound main conductor portion in the coil conductor pattern provided on the insulation resin layer in the first region, and a wound main conductor portion in the coil conductor pattern provided on the insulation resin layer in the second region, the wound main conductor portions overlapping with each other throughout an entire or substantially an entire circumference of the wound main conductor portions in plan view.

4. The laminated coil according to claim 1, further comprising a through hole passing through the laminate from a top surface to a bottom surface in an opening of the coil conductor pattern in plan view.

5. The laminated coil according to claim 4, further comprising a protective film that is disposed on or in at least one of the top surface and the bottom surface of the laminate so as to cover the through hole.

6. The laminated coil according to claim 5, wherein the protective film is made of a material having translucency and insulating properties.

7. The laminated coil according to claim 1, wherein at least one of the main conductor portions is defined by a triple-wound linear conductor with a constant or substantially constant width.

8. The laminated coil according to claim 1, wherein at least one of the plurality of insulation resin layers further includes a wiring conductor pattern that is spaced away from the coil conductor pattern.

9. The laminated coil according to claim 1, wherein at least one of the main conductor portions is defined by a double-wound linear conductor with a constant or substantially constant width.

10. The laminated coil according to claim 3, wherein at least one of the main conductor portions is defined by a double-wound linear conductor with a constant or substantially constant width around about ¾ of a circumference of the at least one of the main conductor portions.

11. The laminated coil according to claim 4, wherein the through hole defines an alignment mark of the laminated coil.

12. The laminated coil according to claim 5, wherein the protective film is disposed in or on the top surface and the bottom surface of the laminate.

* * * * *